Feb. 17, 1925.
F. ROST
1,526,609
MAGNETO ADJUSTER FOR FORD AUTOMOBILES
Filed Feb. 18, 1922
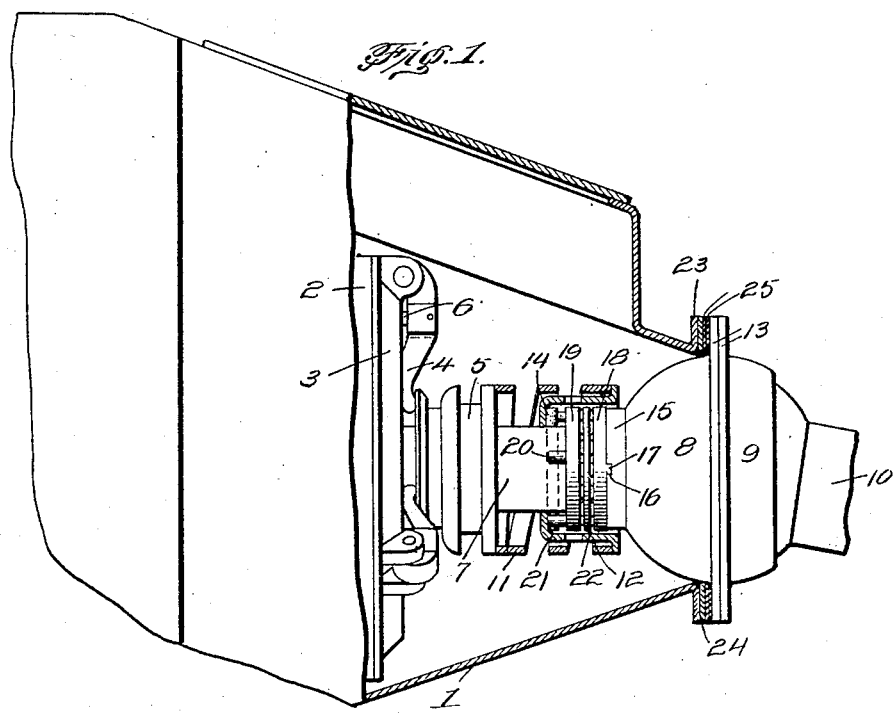
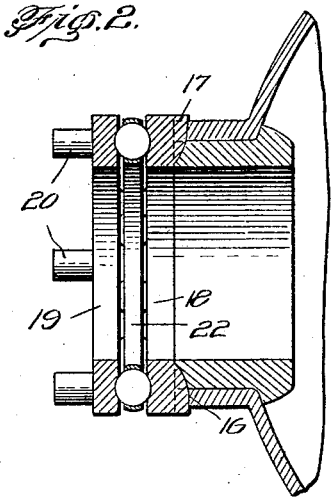 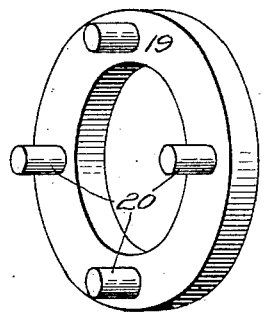 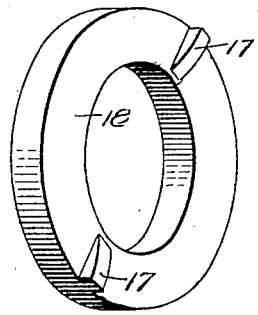
Frank Rost, INVENTOR.
BY Geo. P. Kimmel
ATTORNEY.

Patented Feb. 17, 1925.

1,526,609

UNITED STATES PATENT OFFICE.

FRANK ROST, OF BELLE PRAIRIE, ILLINOIS.

MAGNETO ADJUSTER FOR FORD AUTOMOBILES.

Application filed February 18, 1922. Serial No. 537,587.

*To all whom it may concern:*

Be it known that I, FRANK ROST, a citizen of the United States, residing at Belle Prairie, in the county of Hamilton and State of Illinois, have invented certain new and useful Improvements in Magneto Adjusters for Ford Automobiles, of which the following is a specification.

This invention has reference to improvements in magneto adjustments for Ford automobiles whereby compensation may be made for the wear in the adjustments of the crank shaft and consequently changes in the adjustment of the magneto parts as to their spacing due to wear.

When the rotor and stator of a magneto of a Ford engine leave the factory, the two parts are within a certain distance of each other, the clearance being close but ample and such that experience has shown to be proper to obtain the proper electrical effects.

After a Ford engine has been run for a fixed time, the wear on the bearings due to the end thrust is such that the rotor becomes spaced from the stator to too great an extent to maintain the proper electrical effect of one or the other and the currents generated by the magneto are greatly weakened.

In the Ford engine, the rotor of the magneto is mounted on the crank shaft or part carried thereby and the crank shaft is provided with thrust bearings sustaining the end thrust of the crank shaft, which thrust subjects the support of the crank shaft to end wear, wherefore, in the course of time, the initial adjustment of the crank shaft is disturbed to such an extent that such bearings become loose and the initial gap between the rotor and stator of the magneto becomes enlarged and the effectiveness of the magneto is correspondingly reduced to the detriment of the engine.

For the best effects, experience has taught that the rotor of the magneto should be spaced from the stator thereof by a fixed distance and should this distance become enlarged through wear the output of the magneto is very rapidly decreased.

In accordance with the invention, ball or anti-friction thrust bearings are associated with the universal joint connecting the drive shaft members and include an appropriate number of shims or gaskets, so that in the case of end wear, such wear may be compensated for and the gap in the magneto assembly enlarged by the end wear may be restored to the original condition, whereupon the output of the magneto is restored to its original state. Furthermore, this adjustment may be accomplished without dismounting the engine to any material extent and with little trouble, or expense and without requiring any particular skill in effecting the adjustment.

The invention will be best understood from a consideration of the following detailed description taken in connection with the accompanying drawings forming a part of this specification, with the understanding that the invention is not confined to any strict conformity with the showing of the drawing but may be changed and modified so long as such changes and modifications mark no material departure from the salient features of the invention as expressed in the appended claims.

In the drawings:—

Figure 1 is a longitudinal section, with some parts in elevation, through the transmission casing of a Ford automobile and showing the invention applied.

Fig. 2 is a longitudinal section on a larger scale than Fig. 1.

Fig. 3 is a perspective view of a portion of the universal joint employed in connection with the structure of Fig. 1.

Fig. 4 is a perspective view on the same scale as Fig. 3, but showing the companion member of the joint of which one member is the scale of Fig. 3.

Referring to the drawings and more particularly to Fig. 1, there is shown a transmission casing 1 such as is customarily employed in the Ford automobile, the showing of the drawing being limited to the clutch and universal joint ends thereof.

Contained in the transmission casing 1 are drums, of which the brake drum only is shown at 2. There is also shown a driving plate 3 carrying the usual driving fingers 4 engaging the clutch shift mechanism 5 in turn acting upon the clutch fingers 6 common to the Ford automobile and consequently requiring no special description.

The driving plate 3 actuates a drive shaft member 7 connected to a front universal bearing cap 8 associated with a rear universal bearing cap 9, which latter is connected to the rear member 10 of the drive shaft. these parts being common to the Ford automobile and hence requiring no special description.

The clutch shift 5 is engaged by the forward end of the clutch spring 11 also common to the Ford automobile and this spring, at its rear end, engages a clutch spring support 12. The spring 11, when released from constrain, actuates the fingers 6 to cause the clutch to grip.

The universal joint cups or housing 8 and 9 are each provided, where joining with peripheral flanges 13 by means whereby they may be made fast to the transmission housing 1 in the usual manner.

The clutch spring support 12 is engaged by one end of the clutch spring 11 and at the other end surrounds the clutch spring support and holds the corresponding ends of the clutch spring and is in turn carried by a pin or pins 14 traversing the shaft section 17.

The section 8 of the universal joint member has an axial extension 15 provided with peripheral notches 16 in which engage lugs 17 on the marginal portion of a ball race 18 held stationary with the universal joint section 8 by the engagement of the lugs 17 in the notches 16.

There is another ball race 19 surrounding the shaft section 7 within the clutch spring support 12 and this race 19 is provided with a number of axial pins 20 engaged by other pins 21 traversing the shaft section 7. Between the ball races 18 and 19 there is lodged a ball cage 22 permitting free course of the cage 22 and the free movement of the ball bearings represented by the races 18 and 19 and the ball cage 22, wherefore the shaft sections 7 and 10 may freely rotate when the clutch is in action whether the two sections of the drive shaft are in alinement or at an angle one to the other and therefore greatly reduces any friction that might arise because of the lack of alinement of the drive shaft.

With the transmission casing of a Ford automobile equipped as described, that is, with the usual universal joint in the power shaft provided with a ball bearing assembly having a ball bearing cage and flanking ball races and the universal joint housing made fast to the end of the transmission casing with a suitable number of intervening shims, the structure will operate as follows:

When the automobile is new or is newly adjusted, the universal joint members are secured to the rear end of the transmission casing by bolts or screws held firmly in position and having interposed between the flanges 13 and the rear end 23 of the transmission casing, an anti-leak gasket 24 and a plurality of shims 25. The shims 25 establish a certain relation of the crank shaft and parts carried thereby and the engine casing so that there may be more or less wear between the crank shaft and its bearings before sufficient looseness occurs to interfere with the electrical output of the magneto. When this last condition takes place, it is only necessary to loosen up the universal joint holding screws or bolts and remove a shim and again tighten up the screws or bolts, thus reestablishing the original relation of the parts and thus compensating for wear due to the thrust of the crank shaft and other worn parts. This establishes the original working conditions and restores the full efficiency of the magneto and consequently the full working efficiency of the engine as a whole.

What is claimed is:—

1. In a thrust bearing for the shafting of automobiles, the combination with a shaft, a clutch spring support mounted thereon and having a flange at its rear end, the front universal housing part provided with notches at its forward end and the transmission casing, of a pair of spaced opposed ball race forming members mounted on the shaft and enclosed by said support, one of said members provided with lugs seating in said notches, the other of said members and said shaft having coacting means for coupling one to the other, a ball bearing element interposed between and contacting with said members, a clutch spring surrounding said support and abutting against said flange, and shims removably secured between one end of said casing and the rear end of said part.

2. In a thrust bearing for the shafting of automobiles, the combination with a shaft, a clutch spring support mounted thereon and provided with a flange at its rear end, and a front universal housing part provided with an extension at its forward end formed with a plurality of notches, of a pair of a front and a rear ball race forming members opposing and spaced from each other and mounted on said shaft, said rear member provided with lugs seated in said notches, said forward member and said shaft having coacting means for connecting one to the other, a ball bearing element interposed between said members, said members and element enclosed by said support, and a clutch spring surrounding said support and engaging the flange thereof.

In testimony whereof, I affix my signature hereto.

FRANK ROST.